United States Patent [19]

Lippert

[11] Patent Number: 4,800,471
[45] Date of Patent: Jan. 24, 1989

[54] BRAKE LIGHT ATTACHMENT

[76] Inventor: Raymond E. Lippert, Box 330 Oceanside Village, Surfside Beach, S.C. 29575

[21] Appl. No.: 230,364

[22] Filed: Aug. 10, 1988

[51] Int. Cl.⁴ ............................ B60Q 1/26; B60Q 1/44
[52] U.S. Cl. ........................................ 362/80; 362/82; 362/368; 362/61; 340/66; 340/102
[58] Field of Search .............. 362/61, 73, 80, 82, 362/83, 368; 340/87, 60, 102, 135; 280/186, 292, 456 A, 460 A, 461 A, 504, 510, 511, 515, 491 A

[56] References Cited

U.S. PATENT DOCUMENTS

| | | | |
|---|---|---|---|
| 2,705,157 | 3/1955 | Dail | 280/515 |
| 3,059,105 | 10/1962 | Roe et al. | 362/61 |
| 3,080,581 | 3/1963 | Smihal | 362/61 |
| 3,331,957 | 7/1967 | Adams et al. | 362/61 |
| 3,381,118 | 4/1968 | Widner | 362/61 |
| 3,691,366 | 9/1972 | Spreuer | 346/87 |
| 3,885,146 | 5/1975 | Whitley, Jr. | 362/61 |
| 4,091,442 | 5/1978 | Markey | 362/61 |
| 4,195,704 | 4/1980 | Bass et al. | 280/515 |
| 4,449,167 | 5/1984 | Cohen | 362/61 |
| 4,463,411 | 7/1984 | Proctor | 362/61 |
| 4,602,320 | 7/1986 | Tomkin et al. | 362/80 |
| 4,613,927 | 9/1986 | Brandt | 362/80 |
| 4,626,967 | 12/1986 | Segoshi | 362/61 |
| 4,692,845 | 9/1987 | Widhalm et al. | 362/61 |
| 4,703,398 | 10/1987 | Huth et al. | 362/61 |

FOREIGN PATENT DOCUMENTS 58-12847 1/1983 Japan ................................ 362/82

Primary Examiner—Ira S. Lazarus
Assistant Examiner—David Messer
Attorney, Agent, or Firm—Jerry T. Kearns

[57] ABSTRACT

A brake light attachment, for use with class II or III trailer hitches having a trailer hitch tongue receiving socket and an electrical plug connector having contacts for operating trailer brake lights and trailer turn signal lights, has an elongated generally rectangular shank with a first end dimensioned for insertion into the trailer hitch tongue receiving socket. A transverse bore formed through the shank receives a trailer hitch tongue retaining pin which serves to secure the shank in the tongue socket. A housing is mounted on a standard which is transversely attached at a second end of the shank and has a light bulb mounted in a socket. Light from the bulb is transmitted through a removable lens cover in the housing. The brake light attachment has an electrical cord having a first end connected to the bulb socket and a second end provided with an electrical plug configured for tapping the trailer brake light contacts of the trailer hitch electrical plug connector. The device is adapted for use with motor homes or other large vehicles which are not provided with a standard type of third brake light.

6 Claims, 3 Drawing Sheets

BRAKE LIGHT ATTACHMENT

BACKGROUND OF THE INVENTION

1. Field of the Invention

The present invention relates to brake light attachments, and more particularly pertains to a new and improved brake light attachment adapted for removable insertion into a trailer tongue receiving socket of a class II or III trailer hitch. Large vehicles, such as motor homes or trucks, are not conventionally provided with a third central brake light. Studies have shown that vehicles equipped with such third central brake lights are less frequently involved in rear end collisions than those not so equipped. In order to provide this safety advantage to such vehicles, the present invention provides an easily installed attachment for providing a third central brake light.

2. Description of the Prior Art

Various types of brake light attachments are known in the prior art. A typical example of such a brake light attachment is to be found in U.S. Pat. No. 4,463,411, which issued to R. Proctor on July 31, 1984. This patent discloses a supplementary upper brake light for use in road vehicles which has a brake light casing provided with an adhesive pad or strip for attachment of the brake light to the inside surface of a rear vehicle window. U.S. Pat. No. 4,602,320, which issued to D. Tomkin et al on July 22, 1986, discloses an adjustable safety lamp for mounting upon the rear window of an automobile. The device has a frame adapted for adhesive securement to the window and an outer adjustable housing secured to the frame. U.S. Pat. No. 4,613,927, which issued to W. Brandt on Sept. 23, 1986, discloses a signal indicator for an automobile in the form of a reduced size model of an automobile mounted behind the rear window of the vehicle. U.S. Pat. No. 4,626,967, which issued to T. Segoshi on Dec. 2, 1986, discloses an auxiliary lamp for a vehicle adapted for mounting on the package tray of a vehicle adjacent the rear vehicle window. U.S. Pat. No. 4,703,398, which issued to L. Huth et al on Oct. 27, 1987, discloses an auxiliary brake light for motor vehicles which consists of a socket mounted on the hat storage shelf and of a light housing pivotally mounted on the socket toward the rear window.

While the above mentioned devices are suited for their intended usage, none of these devices disclose a brake light attachment having an elongated shank adapted for insertion into the tongue receiving socket of a class II or class III trailer hitch. Additionally, none of the aforesaid devices are suitable for connection to a conventional trailer hitch electrical plug connector. Inasmuch as the art is relatively crowded with respect to these various types of brake light attachments, it can be appreciated that there is a continuing need for and interest in improvements to such brake light attachments, and in this respect, the present invention addresses this need and interest.

SUMMARY OF THE INVENTION

In view of the foregoing disadvantages inherent in the known types of brake light attachments now present in the prior art, the present invention provides an improved brake light attachment. As such, the general purpose of the present invention, which will be described subsequently in greater detail, is to provide a new and improved brake light attachment which has all the advantages of the prior art brake light attachments and none of the disadvantages.

To attain this, a representative embodiment of the concepts of the present invention is illustrated in the drawings and consists of a brake light attachment, for use with class II or III trailer hitches having a trailer hitch tongue receiving socket and an electrical plug connector having contacts for operating trailer brake lights and trailer turn signal lights, which has an elongated generally rectangular shank with a first end dimensioned for insertion into the trailer hitch tongue receiving socket. A transverse bore formed through the shank receives the trailer hitch tongue retaining pin and serves to secure the shank in the tongue socket. A housing is mounted on a standard which is transversely attached at a second end of the shank and has a light bulb mounted in a socket. Light from the bulb is transmitted through a removable lens cover in the housing. The brake light attachment has a electrical cord having a first end connected to the bulb socket and a second end provided with an electrical plug configured for tapping the trailer brake light contacts of the trailer hitch electrical plug connector. The device is adapted for use with motor homes or other large vehicles which are not provided with a standard type of third brake light.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved brake light attachment which has all the advantages of the prior art brake light attachments and none of the disadvantages.

It is another object of the present invention to provide a new and improved brake light attachment which may be easily and efficiently manufactured and marketed.

It is a further object of the present invention to provide a new and improved brake light attachment which is of a durable and reliable construction.

An even further object of the present invention is to provide a new and improved brake light attachment which is susceptible of a low cost of manufacture with regard to both materials and labor, and which accordingly is then susceptible of low prices of sale to the consuming public, thereby making such brake light attachments economically available to the buying public.

Still yet another object of the present invention is to provide a new and improved brake light attachment which provides in the apparatuses and methods of the prior art some of the advantages thereof, while simultaneously overcoming some of the disadvantages normally associated therewith.

Still another object of the present invention is to provide a new and improved brake light attachment adapted for securement to a trailer hitch.

Yet another object of the present invention is to provide a new and improved brake light attachment having an elongated shank dimensioned for insertion into the trailer hitch tongue receiving socket of a class II or class III trailer hitch.

Even still another object of the present invention is to provide a new and improved brake light attachment adapted for connection to the electrical plug connector of a trailer hitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
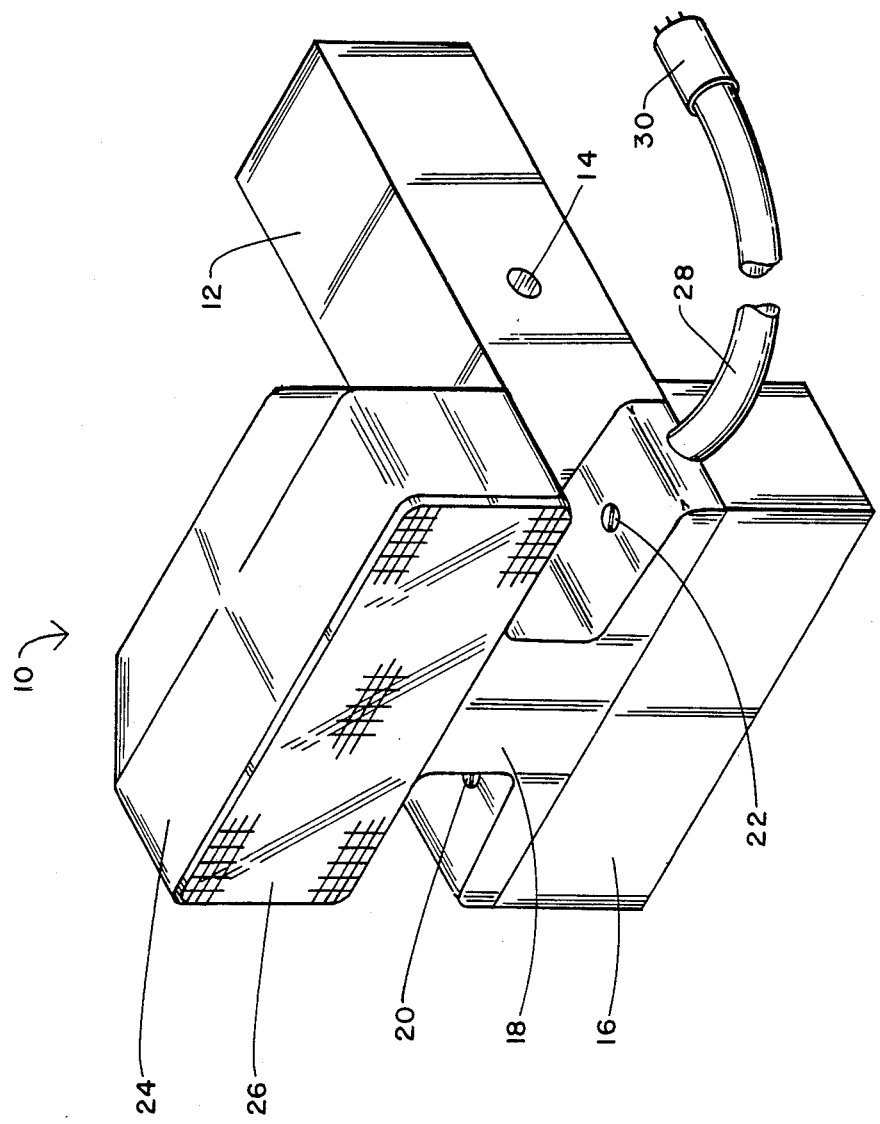
FIG. 1 is a perspective view of the brake light attachment of the present invention.

With reference now to the drawings, and in particular to FIG. 1 thereof, a new and improved brake light attachment embodying the principles and concepts of the present invention and generally designated by the reference numeral 10 will be described.

More specifically, it will be noted that the first embodiment 10 of the invention includes an elongated generally rectangular shank 12 dimensioned for insertion into the tongue receiving socket of a conventional class II or class III trailer hitch. The shank 12 may be formed of various dimensions for use with different standard sized trailer hitches. A transverse bore 14 is formed through the shank 12 for reception of a conventional trailer hitch tongue retaining pin. This serves to secure the brake light attachment 10 to a conventional trailer hitch. A transversely extending mounting block 16 at a second end of the shank 12 provides a mounting surface for the base of a vertically upstanding standard 18. The standard 18 is secured to the mounting block 16 by screws 20 and 22. A housing 24 is formed at a top portion of the standard 18 and has a removable lens cover 26 which may be a conventionally tinted red plastic material. An electrical cord 28 extends from the housing 24 through the interior of the standard 18 and has a first end connected to a conventional bulb socket within the interior of the housing 24. An electrical plug connector 30 is attached at a second end of the cord 28 and is configured in a conventional fashion to engage only the trailer brake light contacts of a conventional trailer hitch electrical plug connector having contacts for trailer brake lights and trailer turn signal lights.

Figure 2:
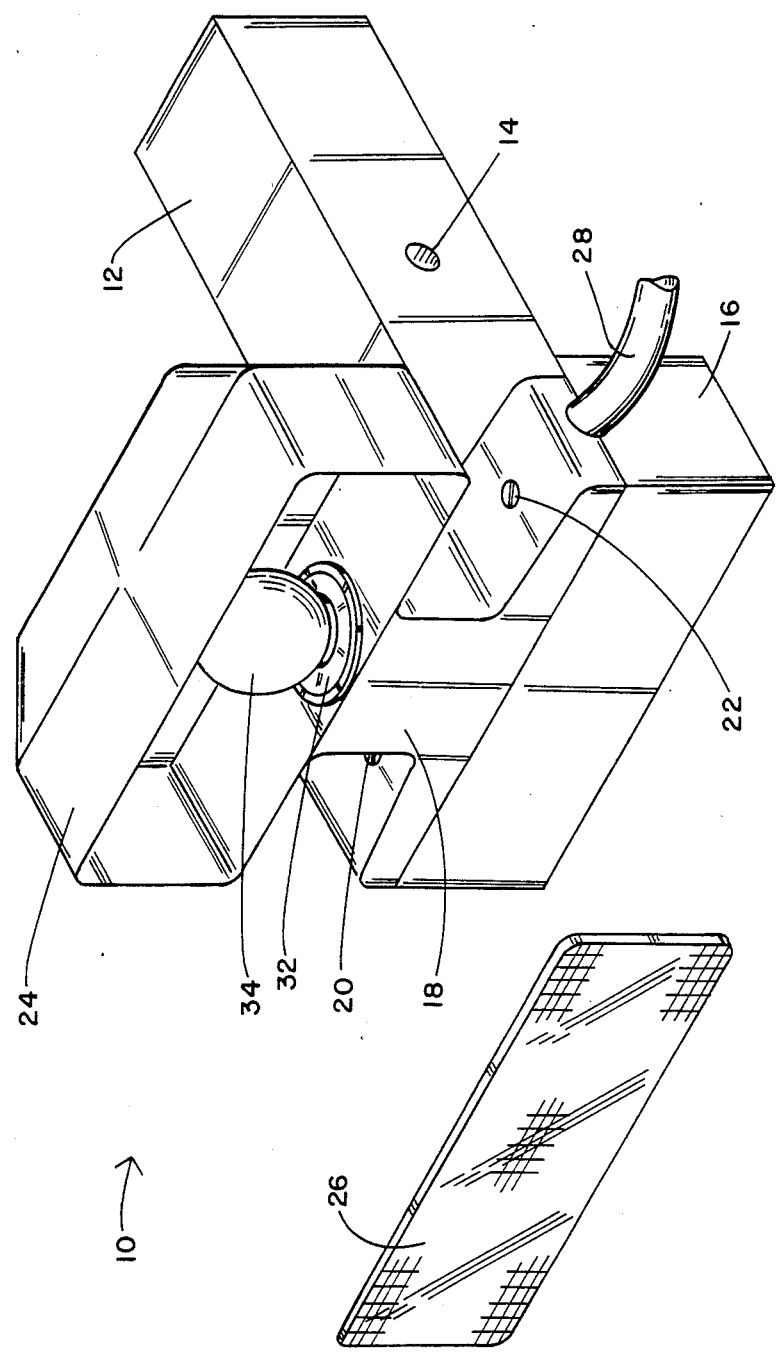
FIG. 2 is a perspective view of the brake light attachment of the present invention, with the housing lens cover removed.

As shown in FIG. 2, the conventional bulb socket 32 removably retains a conventional automotive brake light bulb 34. The cover 26 may be secured to the housing 24 by conventional securement means such as spring clips or screws.

Figure 3:
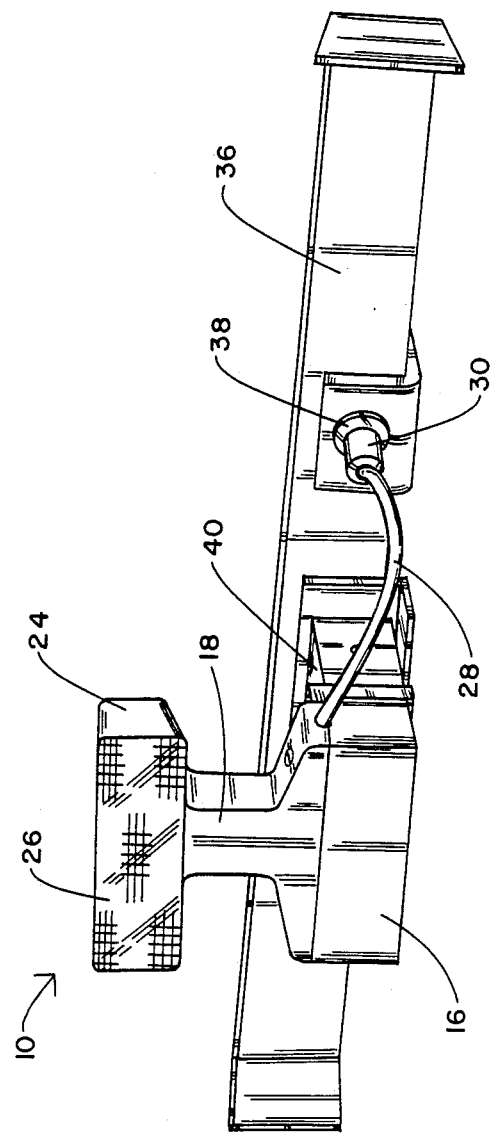
FIG. 3 is a perspective view of the brake light attachment of the present invention, installed on a trailer hitch.

In FIG. 3, a perspective view is provided which illustrates the brake light attachment 10 mounted on a conventional class II or class III trailer hitch 36. The trailer hitch 36 has an electrical plug connector 38 which is conventionally utilized to connect the trailer brake lights and trailer turn signal lights of a towed trailer with the electrical system of the towing vehicle. The trailer hitch 36 also has a conventionally formed trailer hitch tongue receiving socket 40 which consists of a hollow rectangular tube. In conventional use, the tongue of the hitch of a towed vehicle is inserted into the socket 40 and is retained by a transversely extending retaining pin. The brake light attachment 10 of the present invention is utilized when the hitch 36 is not being utilized for towing a vehicle. The elongated shank 12 of the attachment 10 is inserted into the tongue receiving socket 40 of the hitch 36 and is secured in a conventional fashion by insertion of a retaining pin through the transverse bore 14. The plug connector 30 on the electrical cord 28 is then engaged with the trailer hitch electrical plug connector 38. As previously described, the plug connector 30 is configured for tapping only the brake light contacts of the plug connector 38, and thus the interior light bulb 34 is not actuated by the turn signal lights of the vehicle.

As may now be readily understood, the brake light attachment 10 of the present invention may be extremely easily and rapidly installed on any conventional class II or class III trailer hitch. When it is desired to utilize the trailer hitch to tow a vehicle, the brake light attachment 10 may be equally easily and quickly removed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A brake light attachment for use with a trailer hitch, mounted on a vehicle, having an electrical plug connector having contacts for operating trailer brake lights and trailer turn signals and a tongue receiving socket for receiving a trailer tongue, said brake light attachment comprising:

shank means having a first end dimensioned for insertion into the trailer hitch tongue receiving socket;

retaining means for securing said shank means in the tongue receiving socket;

housing means attached to a second end of said shank means;

electrical light producing means in said housing means;

and connecting means for connecting said light producing means to the trailer hitch electrical plug connector.

2. The brake light attachment of claim 1, wherein said retaining means comprises a transverse bore formed through said shank means for reception of a trailer hitch tongue retaining pin.

3. The brake light attachment of claim 1, further comprising lens means on said housing means for transmitting light produced by said light producing means.

4. The brake light attachment of claim 1, wherein said housing means is attached to a standard transversely attached at second end of said shank means.

5. The brake light attachment of claim 1, wherein said connecting means comprises a plug connector configured for engagement only with the brake light contacts of the trailer hitch electrical plug connector.

6. A brake light attachment for use with a trailer hitch, mounted on a vehicle, having an electrical plug connector having contacts for operating trailer brake lights and trailer turn signal lights and a tongue receiving socket on the trailer hitch for receiving a trailer tongue, said brake light attachment comprising:

an elongated generally rectangular shank having a first end dimensioned for insertion into the trailer hitch tongue receiving socket;

a transverse bore formed through said shank for reception of a trailer hitch tongue retaining pin;

a standard transversely attached at a second end of said shank;

a housing mounted on said standard;

a removable lens cover on said housing;

a bulb socket in said housing;

a bulb in said bulb socket;

an electrical cord having a first end operably connected to said bulb socket;

and said electrical cord having a second end provided with an electrical plug configured for tapping only the trailer brake light contacts of said trailer hitch electrical plug connector.

* * * * *